United States Patent [19]

Greenwood

[11] 4,316,710
[45] Feb. 23, 1982

[54] DUPLEX EXTRUDER HEAD

[75] Inventor: Alan Greenwood, Kent, Ohio

[73] Assignee: The Goodyear Tire & Rubber Company, Akron, Ohio

[21] Appl. No.: 133,367

[22] Filed: Mar. 24, 1980

[51] Int. Cl.$^3$ .............................................. B29F 3/04
[52] U.S. Cl. ..................... 425/186; 264/171;
264/177 R; 425/131.1; 425/190; 425/192 R;
425/196; 425/462
[58] Field of Search ............ 425/462, 190, 196, 192 R,
425/186, 131.1, 133.5; 264/177 R, 171

[56] References Cited

U.S. PATENT DOCUMENTS

| | | | |
|---|---|---|---|
| 1,952,469 | 3/1934 | Snyder et al. | 264/171 |
| 2,096,362 | 10/1937 | Lehman | 264/177 R |
| 2,444,831 | 7/1948 | Kilborn | 425/192 R |
| 2,488,830 | 11/1949 | Redington | 425/186 |
| 2,514,211 | 7/1950 | Carlson | 425/190 |
| 2,768,406 | 10/1956 | Carle | 425/192 R |
| 2,897,543 | 8/1959 | Weston et al. | 425/190 |
| 3,354,686 | 11/1967 | Petsch | 425/190 |
| 3,486,195 | 12/1969 | Greenwood et al. | 425/192 R |
| 3,488,807 | 1/1970 | Vossen | 425/192 R |

*Primary Examiner*—Jeffery R. Thurlow
*Attorney, Agent, or Firm*—Frederick K. Lacher; T. P. Lewandowski

[57] ABSTRACT

A duplex extruder head for receiving extrudate from each of two extruders to deliver a composite unitary extrudate such as tire tread stock has a cavity plug or vee-block insert secured in an open top channel-shaped receiver without bolts or hinges by a pair of slidable clamps. The head also has a transverse slot for slidably receiving a die assembly endwise into the slot. The die assembly is then elevated to operating position and securely clamped by a pair of wedge-like gibs. Clamping of either the insert or the die assembly is effected by hydraulic cylinder or equivalent means. The foregoing abstract is not to be taken as limiting the invention of this application, and in order to understand the full nature and extent of the technical disclosure of this application, reference must be made to the accompanying drawing and the following detailed description.

9 Claims, 2 Drawing Figures

DUPLEX EXTRUDER HEAD

The present invention relates to extruder heads and particularly to that class of extruder heads known as duplex extruder heads for receiving extrudates from two extruders and for delivering a unitary composite extrudate such as tire tread stock.

In a particular aspect of the invention there is provided a duplex extruder head comprising passage means defining flow passages from each of two extruders to an outlet face; die means including a die assembly having an upper surface for sealably engaging the outlet face; slide means for clamping said die means to said outlet face including a pair of gibs having longitudinally extending splines arranged at a small angle relative to said outlet face, a pair of ribs extending transversely of and fixed relative to said passage means each rib having a longitudinal groove extending at said small angle and slidably accommodating the respectively associated gib; and drive means connected to the slide means and operable to move said gibs to elevate the die means to engage the outlet face and to lower the die means from said face.

In a particular aspect of the invention there is provided a duplex extruder head comprising receiver means defining a cavity, flow passage insert means removably disposed in said cavity and having an outlet face, die means removably engageable with the outlet face, and clamp means for securing the insert means in the cavity and comprising a plurality of lugs spaced longitudinally of the insert means and overlying the receiver means, each lug having an upper surface inclined at a small angle relative to the outlet face, a pair of ledges extending longitudinally of the receiver means and underlying said lugs, and an opposed pair of clamp yokes each having a flange slidably engageable with the respectively associated ledge and a plurality of lugs each having an inclined lower surface inclined at said small angle and parallel to the respective upper surfaces of the first said lugs, the second said lugs being spaced apart sufficiently to allow the first said lugs to pass upwardly therebetween, and forcing means mounted on the receiver means and operable to move the clamp yokes to engage the associated faces of first and second lugs to secure the insert means in the cavity and oppositely to align the respective second lugs with the spaces defined by the first lugs to allow removal of the insert means.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figure 1:
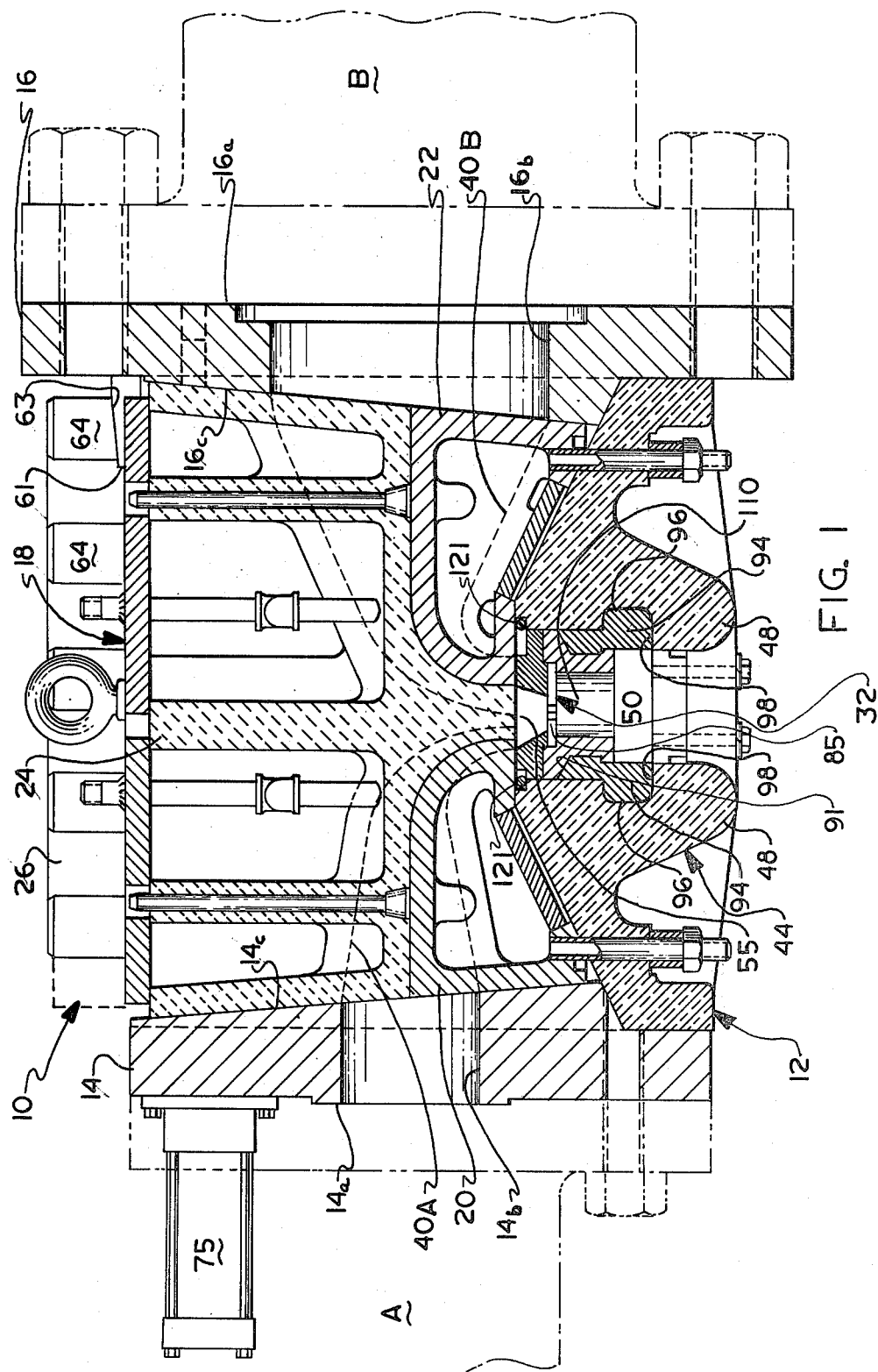
FIG. 1 is an elevation view in longitudinal cross-section of a duplex extruder head in accordance with the invention.

Turning to the drawings, the duplex extruder head 10 comprises a channel-shaped receiver 12, two adapter flanges 14,16, the flow passage insert 18, sometimes referred to as a Vee-block, which is an assembly of three insert members 20,22,24, a pair of clamp yokes 26 which operate to retain the insert or Vee-block in the cavity 30 formed by the receiver and the associated adapter flanges, a die assembly 32 and a die assembly clamp 34. In the particular embodiment here there is also provided a stock cutter 36.

As is illustrated in FIG. 1, the duplex extruder head 10 is disposed and affixed to and between two extruders A,B sometimes called "tubers", which are themselves opposed in axial alignment. Each extruder delivers its output to a flow passage 40A,40B which is constructed and arranged to transform the extruder output from a generally round cross-section to a transversely elongated cross-section and to change the direction of the output flow from the horizontal of the extruder to a generally downward direction.

A notable feature in the extruder head is that the receiver 12 is formed integrally to include two upstanding walls 42 and a bottom 44 extending between the walls. The inward surfaces 46 of the respective walls are parallel, planar and define a channel open upwardly. The bottom 44 of the receiver is formed for stiffness and minimum deflection by the provision of a pair of deep section ribs 48 extending from wall to wall, which ribs are spaced apart to provide a transverse slot 50 in which the die assembly 32 is accommodated.

In order to connect the duplex extruder head 10 to the respective extruders, each of the adapter flanges 14,16 has an outward face 14a,16a configured to be secured to the corresponding flange of the respectively associated extruder to inhibit leakage and is provided with a cylindrical bore 14b,16b through which extrudate from the extruder can enter the flow passage. Each flange 14,16 also is provided with an inner face 14c,16c which is planar and inclined at a small angle divergent downwardly relative to the respective outer face. The respectively inner faces close the opposed ends of the channel of the receiver to form a cavity 30 which has opposed parallel sides and opposed inclined sides and in which the insert or Vee-block 18 is snugly accommodated.

The insert or Vee-block comprises three members 20,22,24 which cooperate to form the two flow passages 40A,40B previously referred to.

The two lower insert members 20,22 can be identical but preferably differ to accommodate the differing flow rates of material from the two extruders and are proportioned to the quantities desired in the final composite extrudate. Each of the two lower insert members defines the respective lower portion of the flow passage extending from the bore to the outlet face of the insert while the upper single insert member 24 defines the upper portions of the respective passages in like manner. As may be seen in FIG. 1, the respective lower members and the upper member have closely abutting surfaces to inhibit the escape of extrudate therebetween. The two lower members and the upper member each terminate at a planar outlet face 55 which extends across the slot 50 and from wall to wall of the receiver. The two lower members 20,22 are normally secured in the receiver, permitting the upper member 24 to be removed, as for cleanout purposes.

Each of the insert members is provided with internal cavities and with inlet/outlet means whereby heat exchange fluid can be circulated to control the temperature of the extrudate passing therethrough.

A particular feature of the head 10 is the construction and arrangement of means for securing the insert 18 in the receiver 12.

To secure the insert 18 in its operating position in the receiver, particularly the upper member 24 of the insert, the latter is provided with flanges extending respectively outwardly over the walls of the receiver to cooperate with a pair of clamp yokes 26. Each of the flanges is slotted to form a plurality of lugs 60, the upper surfaces 61 of which are inclined and cooperate with a correspondingly inclined surface 63 of a plurality of lugs 64 formed integrally in the respective yokes. The spaces between the respective lugs are such as to allow the insert 24 to be removed from or replaced in the receiver 12, the spaces accommodating the respectively associated lugs 64 of the clamp yoke when the latter is moved to its unclamped position.

The respective yokes 26 are each provided with a projection or tongue 65 extending longitudinally of the respective yoke and outwardly thereof to occupy a longitudinal groove 68 in the associated wall of the receiver and there slidably engage a ledge 69 formed in the wall from end to end thereof. As can now be seen, the movement of the clamp yokes so as to position the respective lugs 64 in alignment with the spaces between the lugs 60 of the insert member 24, permits the insert member to be lifted, as by the eye-bolt 71, from the receiver without interference or be placed therein. Movement of the yoke longitudinally to engage the respective inclined surfaces 63 of the yoke lugs 64 with the lugs 60 of the insert member, serves to clamp the insert member securely in its operating position in the receiver.

In order to actuate the clamp yokes 26, a pair of hydraulic cylinders 75 are mounted on the adapter flange 14. Each has its piston rod extended through the flange and fixed to the respectively associated clamp yoke such that operation of the hydraulic cylinder can move the yoke between its clamping and unclamped positions. At the other end of the yoke from the piston rod a small dowel 78 fixed in the yoke extends slidably through a bore in the flange 16. The yoke is thus stabilized for sliding only longitudinally of itself between the flanges.

Although the hydraulic cylinders are preferred as means for forcing the yokes to clamp or to unclamp the cavity plug or insert 18 it will be apparent that equivalent means such as, for example, a screw mechanism, could readily be substituted to move the clamp yokes.

Also contemplated in an alternative construction, the fluid power cylinders can be fixedly mounted on the respectively associated clamp yokes 26. The piston rod of each, which can extend from each end of each cylinder is secured to the associated flange 16 by screw threads in the tapped holes 81, only one of which is shown. In this arrangement, the cylinder and the yoke move together to clamp or to release the insert or Vee-block from the receiver.

A notable feature of the duplex extruder head 10 is the construction and arrangement of the die assembly 32 and of the means for locking the die assembly in operative position.

Figure 2:
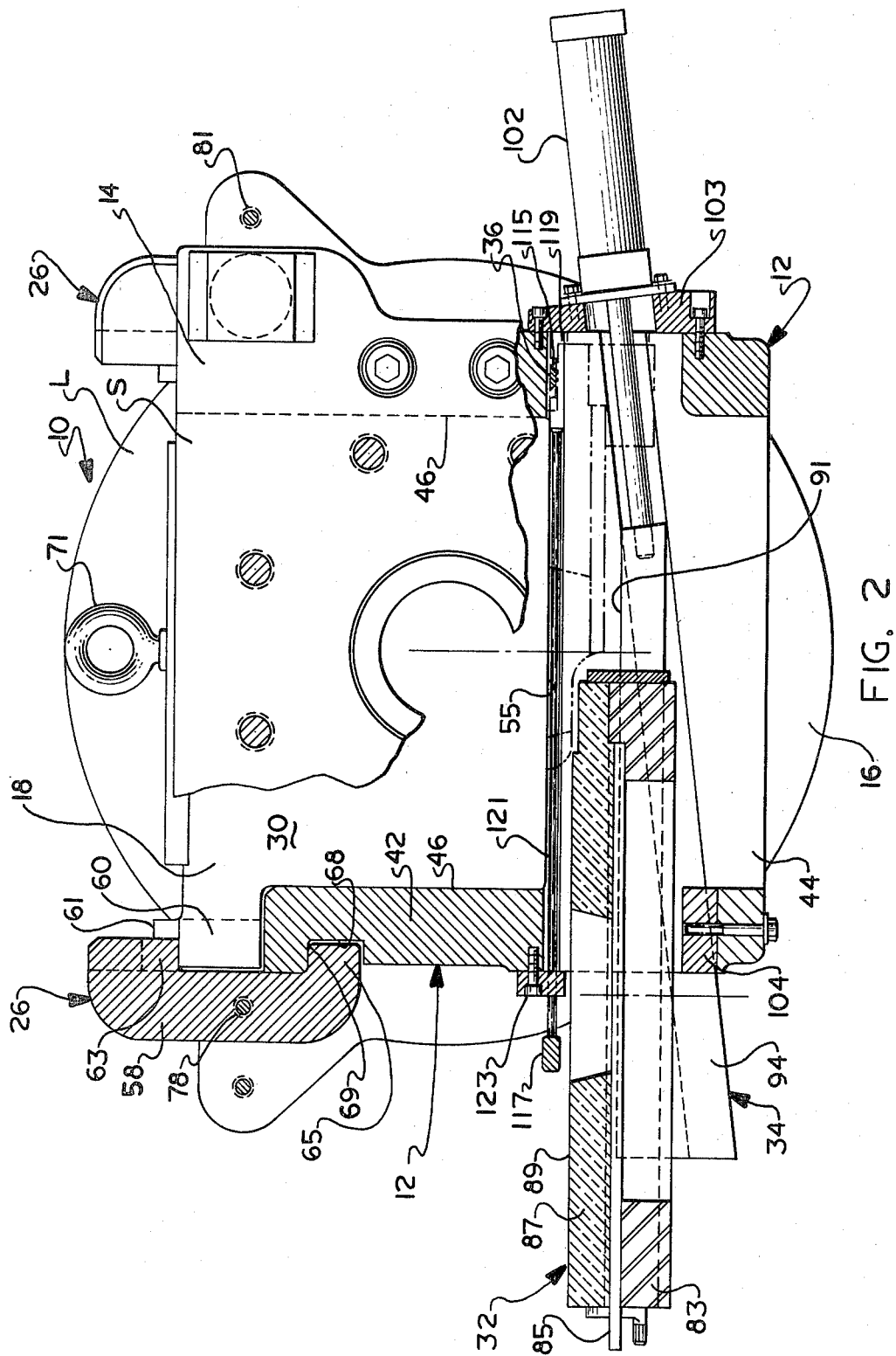
FIG. 2 is a view in end elevation, with parts in section and parts broken away, of the duplex extruder head of FIG. 1.

The die assembly comprises a die holder 83 on which the final profile die 85 is supported. A preform plate 87 is disposed immediately above the profile die and has a planar top surface 89 arranged to engage sealingly the outlet surface 55 of the cavity plug or insert 18. The die assembly can be of unitary monoblock construction, however, it is believed more convenient to assemble a plurality of pieces to make up the die assembly described. As can be seen in FIGS. 1 and 2, the die assembly can be placed in or removed from the head 10 as a unit, being slidable on the horizontally extending upper surface 91 of a pair of gibs 94. Each of the gibs is provided with a spline 96 extending at a small angle, for example, about 7 degrees, with respect to the mentioned top surface.

Each spline slidably interfits a groove 98 formed and extending at a corresponding angle in the associated inward face of the rib 48 of the receiver bottom. The respective inner faces define the previously mentioned slot 50 extending transversely of the receiver.

The two gibs 94 comprise the die assembly clamp 34 and are movable transversely, longitudinally in the respective grooves 98. After the die assembly has been located in appropriate longitudinal register with the flow channels of the insert, the two gibs of the clamp are moved longitudinally, to the right as seen in FIG. 2, so as to elevate the die assembly into firm sealing contact with the outlet face 55 of the insert.

To move the clamp 34, drive means in the form of two hydraulic cylinders 102 are affixed to mounting plates 103 in turn mounted on the receiver. The piston rods of the cylinders are connected respectively to the gibs of the clamp and can be operated to force the die assembly against the outlet face of the insert and, alternatively, to release the die assembly from the outlet face to permit its removal. A small block 104 disposed between the gibs is attached by a pair of bolts to the receiver so as to retain the respective gibs in their grooves 98. The arrangement permits each gib to clamp and to unclamp independently of the other so as to ensure good seating of the die assembly against the outlet face 55.

The die holder, of course, has a clearance opening 110 through which the composite extrudate such as the tire tread stock can pass freely downwardly to further processing in the usual manner.

The stock cutter 36 has a blade 115 which travels along the face 55, being operated by the handle 117. The blade is formed as part of a cross-bar 119 which is connected to the handle by two parallel guide rods 121 slidable in holes formed in a support block 123 fixed in the receiver.

It should also be noted that the die assembly 32 in place in the tread head occupies the space between the previously mentioned parallel rods of the stock cutter 36. The latter cannot be operated with the die assembly in place, but ensures that the die assembly can be removed without being held by residual extrudate.

The drive means which operates the die clamp means can as well be a single hydraulic cylinder connected suitably to both gibs of the clamp. Also, while hydraulic drive means are preferred, it is contemplated as within the scope hereof that the drive means could be provided by another alternative such as a screw thread arrangement.

The duplex extruder head 10 which has been described provides a number of notable advantages. The head is manufactured at low initial cost and is readily accessible for cleaning and other servicing. The respective inclined faces of the end adapter flanges and the insert are more easily finished to precision surfaces and are more securely held into sealing contact to inhibit escape of extrudate between the respective surfaces. The adapter flange can be inexpensively replaced to suit a different extruder. The matching surfaces of the receiver and insert are plane, simple, and require minimum of machine set up.

The tread head described also is notably free of any bolted or hinged connections both of which are excessively subject to improper operation, rapid wear, and early failure. Also, the use of inclined surfaces both with the clamp yokes employed to secure the insert to the receiver and the clamp gibs clamping the die assembly to the outlet face are self-adjusting so as to compensate for inevitable wear during use.

While certain representative embodiments and details have been shown for the purpose of illustrating the invention, it will be apparent to those skilled in the art that various changes and modifications may be made therein without departing from the spirit or scope of the invention.

What is claimed is:

1. A duplex extruder head comprising:
   passage means defining flow passages from each of two extruders to an outlet face;
   die means including a die assembly having an upper surface for sealably engaging the outlet face;
   slide means for clamping said die means to said outlet face including a pair of gibs having longitudinally extending splines arranged at a small angle relative to said outlet face, a pair of ribs extending transversely of and fixed relative to said passage means each rib having a longitudinal groove extending at said small angle and slidably accommodating the respectively associated gib; and
   drive means connected to the slide means and operable to move said gibs to elevate the die means to engage the outlet face and to lower the die means from said face.

2. A duplex extruder head comprising:
   receiver means defining a cavity;
   flow passage insert means removably disposed in said cavity and having an outlet face;
   die means removably engageable with the outlet face; and clamp means for securing the insert means in the cavity and comprising a plurality of lugs spaced longitudinally of the insert means and overlying the receiver means, each lug having an upper surface inclined at a small angle relative to the outlet face, a pair of ledges extending longitudinally of the receiver means and underlying said lugs, and an opposed pair of clamp yokes each having a flange slidably engageable with the respectively associated ledge and a plurality of lugs each having an inclined lower surface inclined at said small angle and parallel to the respective upper surfaces of the first said lugs, the second said lugs being spaced apart sufficiently to allow the first said lugs to pass upwardly therebetween; and forcing means mounted on the receiver means and operable to move the clamp yokes to engage the associated pairs of first and second lugs to secure the insert means in the cavity and oppositely to align the respective second lugs with the spaces defined by the first lugs to allow removal of the insert means.

3. A duplex extruder head for receiving extrudate from two extruders and for delivering a unitary composite extrudate such as tire tread stock and comprising:
   receiver means defining an upwardly open channel having opposed walls providing parallel planar inwardly facing sides and a transversely stiffened bottom joined integrally to the walls;
   flow passage insert means disposed in the receiver means to occupy said channel and having an opposed pair of planar sides slidably engaging the sides of the channel;
   die means providing a die assembly including a die for forming the cross-section contour of the extrudate issuing from the duplex extruder head, the assembly having a first surface engaging in sealing relation with said insert means;
   insert clamp means including a pair of clamp yokes mounted slidably on the receiver means and slidable in one longitudinal sense to secure the insert means in the receiver means and in the opposite sense to release the insert means for removal from the receiver means.

4. A duplex extruder head for receiving extrudate from two extruders and for delivering a unitary composite extrudate such as tire tread stock and comprising:
   receiver means defining an upwardly open channel having opposed walls providing planar parallel inwardly facing sides, open ends, and a transversely stiffened bottom joined integrally to the walls;
   a pair of flange means each removably joined to the receiver means at the respectively open ends and having a first surface adapted for mounting respectively on one of said extruders, a second surface which is planar and inclined at a small angle divergent downwardly relative to the first surface and means defining an opening for flow of extrudate from the associated extruder;
   flow passage insert means disposed in the receiver means to occupy said channel and having an opposed pair of planar sides slidably engaging the sides of the channel, inclined planar end surfaces sealingly engaging respectively the said second surface of each flange means, and an outlet face;
   die means including a die assembly having a die for forming the cross-section contour of the extrudate issuing from the duplex extruder head, the die assembly having a first surface engaging in sealing relation with said outlet face.

5. A duplex extruder head for receiving extrudate from two extruders and for delivering a unitary composite extrudate such as tire tread stock and comprising:
   receiver means defining an upwardly open channel having opposed walls providing parallel planar inwardly facing sides and a transversely stiffened bottom joined integrally to the walls;
   flow passage insert means disposed in the receiver means to occupy said channel and having an opposed pair of planar sides slidably engaging the sides of the channel;
   die clamp means comprising a pair of slideways formed integrally in said receiver means and inclined relative to the outlet face, a clamp having a pair of upper clamp faces for engagement with die means and a pair of gibs extending oppositely outwardly into and longitudinally in the respective slideways, and force means urging the clamp along the slideways to press the die means to sealing engagement with the outlet face.

6. A duplex extruder head as claimed in claim 3, 4, or 5, said flow passage insert means comprising a first and second lower passage member defining respectively the lower portions of each shaped flow passage between the respectively associated extruder and the die means, and a single upper passage member defining the respective upper portions of each said shaped flow passage, the respective members having closely abutting surfaces to minimize escape of extrudate therebetween.

7. A duplex extruder head as claimed in claim 2 or, 3 said insert clamp means comprising on each wall of the receiver means a ledge extending longitudinally of the associated wall, and on said insert means a plurality of spaced apart lugs extending laterally outward above each said wall, each said lug having an inclined top surface, and a pair of yokes each having a longitudinal tongue engaged with and slidable along the respectively associated ledge and a plurality of spaced apart lugs each having an inclined surface opposed respectively to and engageable with the associated inclined top surfaces of the respective lugs of the insert means to secure the insert means in the receiver means, the lugs of the respective yokes being spaced to allow the lugs of the insert means to pass therebetween.

8. A duplex extruder head as claimed in claim 3, further comprising forcing means operable to move said yokes between a clamping position and an unclamping position.

9. A duplex extruder head as claimed in claims 1, 3, or 5, further comprising stock cutter means including a blade, a parallel spaced pair of slide rods connected to the blade, and a handle attached to the slide rods, the cutter means operable while the die assembly is apart from the outlet face to sever said composite extrudate outward of said outlet face from the extrudate contained in said passages inward of and upstream from said outlet face.

* * * * *